US012596828B2

(12) United States Patent
Tyagi et al.

(10) Patent No.: US 12,596,828 B2
(45) Date of Patent: Apr. 7, 2026

(54) METHOD AND SYSTEM FOR SOVEREIGN DATA STORAGE

(71) Applicant: MASTERCARD INTERNATIONAL INCORPORATED, Purchase, NY (US)

(72) Inventors: Rahul Kumar Tyagi, Dublin (IE); John Allen, Newcastle (IE); Ashley Waldron, Dublin (IE); Peter Groarke, Dublin (IE)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 122 days.

(21) Appl. No.: 18/577,900

(22) PCT Filed: Jun. 13, 2022

(86) PCT No.: PCT/US2022/033181
§ 371 (c)(1),
(2) Date: Jan. 9, 2024

(87) PCT Pub. No.: WO2023/003651
PCT Pub. Date: Jan. 26, 2023

(65) Prior Publication Data
US 2024/0346165 A1 Oct. 17, 2024

(30) Foreign Application Priority Data

Jul. 22, 2021 (EP) ..................................... 21187144

(51) Int. Cl.
*G06Q 50/26* (2024.01)
*G06F 21/60* (2013.01)
(Continued)

(52) U.S. Cl.
CPC ........ *G06F 21/6218* (2013.01); *G06F 21/602* (2013.01)

(58) Field of Classification Search
None
See application file for complete search history.

(56) References Cited

U.S. PATENT DOCUMENTS 8,166,565 B1 4/2012 Tormasov et al.
8,407,190 B2 3/2013 Prahlad et al.
(Continued)

FOREIGN PATENT DOCUMENTS

CN 105488100 A * 4/2016 ............. G06F 16/29

OTHER PUBLICATIONS

Big Data Analytics in Healthcare—A Systematic Literature Review and Roadmap for Practical Implementation. Imran. IEEE. (Year: 2021).*

(Continued)

*Primary Examiner* — Venkat Perungavoor
(74) *Attorney, Agent, or Firm* — Talem IP Law, LLP

(57) ABSTRACT

Computer implemented method for sovereign data storage comprising: authenticating a write request to upload data files to a global database system, determining relevant data types of the data files, determining a relevant regulatory domain associated with the data files out of a plurality of regulatory domains, applying regulatory domain rules associated with the one or more determined relevant regulatory domains to store the data files on one or more storage devices associated with the one or more relevant regulatory domains, assigning meta data information to the data files, the meta data information being based on regulatory domain rules associated with the one or more determined relevant regulatory domain, sending the data files to a storage engine according to the regulatory domain rules for storage of the data files, receiving a search key associated with the stored data files for local storage at the edge node and dispersing the search keys.

13 Claims, 5 Drawing Sheets

(51) Int. Cl.
G06F 21/62 (2013.01)
G06F 21/31 (2013.01)

(56) References Cited

U.S. PATENT DOCUMENTS

| | | | | |
|---|---|---|---|---|
| 10,536,465 | B2 * | 1/2020 | Sommerfelt | H04L 63/104 |
| 10,742,714 | B2 * | 8/2020 | Singhvi | G06F 16/183 |
| 2017/0177895 | A1 * | 6/2017 | McHale | G06F 21/6218 |
| 2018/0025011 | A1 * | 1/2018 | Aksionkin | H04L 63/20 |
| | | | | 707/692 |
| 2018/0034703 | A1 * | 2/2018 | Anholt | H04L 67/51 |
| 2018/0205739 | A1 | 7/2018 | Sommerfelt et al. | |
| 2021/0026841 | A1 * | 1/2021 | Kumawat | H04L 9/3239 |
| 2021/0333995 | A1 * | 10/2021 | Grossman | H04L 63/0263 |
| 2023/0229674 | A1 * | 7/2023 | Shemer | G06F 16/2282 |
| | | | | 707/802 |

OTHER PUBLICATIONS

Review Security and Privacy in Big Data Life Cycle: A Survey and Open Challenges. Ko et al. MDPI. (Year: 2020).*
Supporting Data Portability in the Cloud Under the GDPR. Wang. (Year: 2018).*
Extended European Search Report issued in European Patent Office Application No. 21187144.7, mailed Dec. 20, 2021, 6 pages.
International Search Report and Written Opinion issued in International Application No. PCT/US2022/033181, mailed Sep. 21, 2022, 10 pages.

\* cited by examiner

101 Authenticate User

102 Determine Relevant Data Types

103 Determine Relevant Regulatory Domain

104 Apply Regulatory Domain Rules

105 Assign Meta Data Information

106 Send Data Files to Storage Engine

107 Receive a Search Key From the Storage Engine

108 Disperse the Search Key to Other Edge Nodes

100

309

Written Data Blob

Meta Data fields
ownerRegion: IN
allowedAccessRregions:IN,US
ownerRegionExpiry: 01/2030
nonOwnerRegionExpiry: 90 Days
nonOwnerRegionCache : Allowed
encryptionkey - wrapped CEK JWE content / Data Replication Region US Region EU Forbidden region
for replication Region IN

308

307

306

302

303

304

Write Request

305

Authorization
Service

301

300

409

Requested Data Blob

Meta Data fields
ownerRegion:IN
allowedAccessRegions:IN,US
ownerRegionExpiry: 01/2030
nonOwnerRegionExpiry: 90 Days
nonOwnerRegionCache : Allowed
encryptionkey - wrapped CEK JWE content / Data

METHOD AND SYSTEM FOR SOVEREIGN DATA STORAGE

CROSS-REFERENCE TO RELATED APPLICATIONS

This application is the U.S. National Stage Application of International Application No. PCT/US2022/033181, filed Jun. 13, 2022, which claims the benefit of European Patent Application Ser. No. 21/187,144.7, which was filed on Jul. 22, 2021, the entire contents of which are hereby incorporated by reference for all purposes.

TECHNICAL FIELD

This invention relates to storage of sovereign data. In particular, a method and system for storing data according to the data sovereignty requirement of the country in which the data is collected, processed and/or stored.

BACKGROUND

Data privacy and security is a familiar issue raised when it comes to data handling, processing and storage, especially for electronic data. It is well known that the handling of sensitive data such as personal data, confidential data, financial data, and intellectual property data, has to meet certain regulatory requirements when being collected, processed, transferred, stored or handled in any other way. As such, there are legal regulations in place on the handling of personal data, such as the emergence of the General Data Protection Regulation (GDPR) in the European Union (EU) and European Economic Area (EEA). These regulations, such as GDPR, fall under a regulatory domain and are subject to data residency and compliance regulations as defined by a common area, i.e. the EU. Further, multinational companies might also have set up internal regulations—besides legal regulations—which need to be reflected in data handling.

Having regional restrictions, such as in regulatory domains, can be problematic when handling data internationally as authorities in various regulatory domains (for example EU, China, Russia, India) have introduced regulations governing certain types of data (Personal Data, Card Data). These regulations place restrictions on, for example, where that data can be stored, what locations that data can be accessed from, expiration limits on that data, to name a few. These are sometimes referred to collectively as On-Soil regulations (OSR). OSR creates challenges for companies that have customer data in multiple relevant regulatory domains in that the companies need to store and handle (replication, accessing, expiration) the data differently per regulatory domain.

The method and system proposed describes an efficient and secure mechanism of handling such data which satisfies the OSRs but which is generic.

SUMMARY

The present invention is directed to methods, systems, storage media and computer programs according to the appended claims.

In an aspect of the invention there is provided a computer implemented method for sovereign data storage, the method comprising: authenticating, via a client identifier, a write request to upload one or more data files to a global database system; determine, at an edge node of a plurality of edge nodes forming a proxy layer, relevant data types of the one or more data files; determine, at the edge note, a relevant regulatory domain associated with the one or more data files out of a plurality of regulatory domains; apply, at the edge node, regulatory domain rules associated with the one or more determined relevant regulatory domains to store the one or more data files on one or more storage devices associated with the one or more relevant regulatory domains; assign, at the edge node, meta data information to the one or more data files, the meta data information being based on regulatory domain rules associated with the one or more determined relevant regulatory domain; send, at the edge node, the one or more data files to a storage engine according to the regulatory domain rules for storage of the one or more data files; receiving, at the edge node from the storage engine, search keys associated with the stored one or more data files for local storage at the edge node; and dispersing, from the edge node to the other edge nodes of the plurality of edge nodes forming the proxy layer, the search keys.

In embodiments of the present invention, the regulatory domain rules may be associated with a particular region. Each region will have regulatory domain rules and the system will be able to classify and select the appropriate region and the appropriate regulatory domain rules from a list of worldwide regulatory domains, covering all possible regions.

In embodiments of the present invention, the regulatory domain rules may represent a data policy of the associated particular region. Thus, the regulatory domain rules can be a reflection of the data policies for that particular region, for example what data can or cannot be stored in that particular region.

In embodiments of the present invention, the regulatory domain rules may comprise: access permission; replication instructions; and/or expiration. Applying these rules to the data tells the system who can have access to the data, from which jurisdiction the data can be accessed from, if the data can be replicated in other jurisdictions or if the data has an expiration date, i.e. can only be stored for a particular length of time. It will be apparent to the skilled person that other regulatory domain-type rules may be adopted.

In embodiments of the present invention, the method may further comprise, on the storage engine, encrypting the one or more data files with encryption keys. This has the advantage of providing added security to the data and stopping any unauthorised person(s) from accessing the data. The data will only be accessed if the encrypted key is able to be decrypted.

In embodiments of the present invention, the global database system may create search indices according to the one or more data files and the assigned meta data. Creating search indices increases the efficiency of the system by finding the appropriate data quicker when a user of the global database system is trying to access the data.

In embodiments of the present invention, the meta data files may comprise a reference to the regulatory domain rules located outside the global database system. Having only the reference to the regulatory domain rules in the meta data files, and accessing them externally uses less storage on the global database system. It also means that the system does not need updating whenever a data policy or regulation changes for a particular region as the regulatory domain rules will derived from the external up-to-date data policies.

In embodiments of the present invention, the meta data files may comprise the regulatory domain rules. Having the regulatory domain rules within the meta data files allows the system to be a complete integrated package such that no external processes are required, which increases security of the global database system.

In embodiments of the present invention, the one or more data files may be automatically deleted after expiration of the data in accordance with the associated regulatory domain rules. The automation of deleting data after expiration increases the efficiency of the system, such that there is no need to manually delete data when the expiration date has been reached. For example, data that can only be stored in India for 90 days, will be automatically deleted after 90 days from when the data was initially stored. Further, deletion of stored data files may also be triggered by a request of a user irrespective of the applied rules.

In embodiments of the present invention, the meta data files may be automatically updated when a change in the regulatory domain rules occurs. Therefore, once a data policy or regulation changes and the regulatory domain rules are updated to reflect the policy or regulation change, the meta data files are also automatically updated to reflect this change. For example, if for a particular data policy the data expiry for a particular region is changed from 90 days to 60 days, not only do the regulatory domain rules update but the fields of the meta data files or also changed to reflect the change of the rules. For this example the field of the meta data files will be changed from 90 to 60. Again, this increases the efficiency of the system and does not need any external monitoring or processing when a data policy changes. The updating of the meta data files aids in the searching of relevant stored data.

In embodiments of the present invention, the system may also be configured to delete any stored data files that have changed in expiration. Like the example above, any data that has been stored for 60 days already will be automatically deleted. Further, deletion of stored data files may also be triggered by a request of a user.

In embodiments of the present invention, the meta data files may not be altered once stored. This alternative embodiment means that for any policy or regulatory change the meta data files currently assigned to the one or more stored data files cannot be changed, thus a new meta data file will be created for each policy change. Creating new meta data files allows the system to keep a log of the different meta data files that have been created for a particular stored data file which may help for recovery of data as a trace can be made, for example.

In an aspect of the invention there is provided a computer implemented method for accessing data stored, the method comprising: authenticating, via a client identifier, a read request to access one or more data files stored in a global database system; searching the meta data information on the proxy layer related to the read request of the one or more data files; returning the stored data files if rules of access based on the meta data information and the client identifier are satisfied, or restricting access to the stored data files if rules of access based on the meta data information and the client identifier are not satisfied.

In an aspect of the invention there is provided a data handling system, comprising: a global database system comprising: an authentication component; an uploading component; an identification component; a metadata component; a communication component; wherein, the system is configured to perform the methods as described above.

In an aspect of the invention there is provided a storage medium storing instructions when executed by a processor, are configured to implement the data handling methods as described above.

In an aspect of the invention there is provided a computer program comprising instructions which, when the program is executed by a processor, cause the processor to carry out the methods as described above.

DETAILED DESCRIPTION

Figure 1:
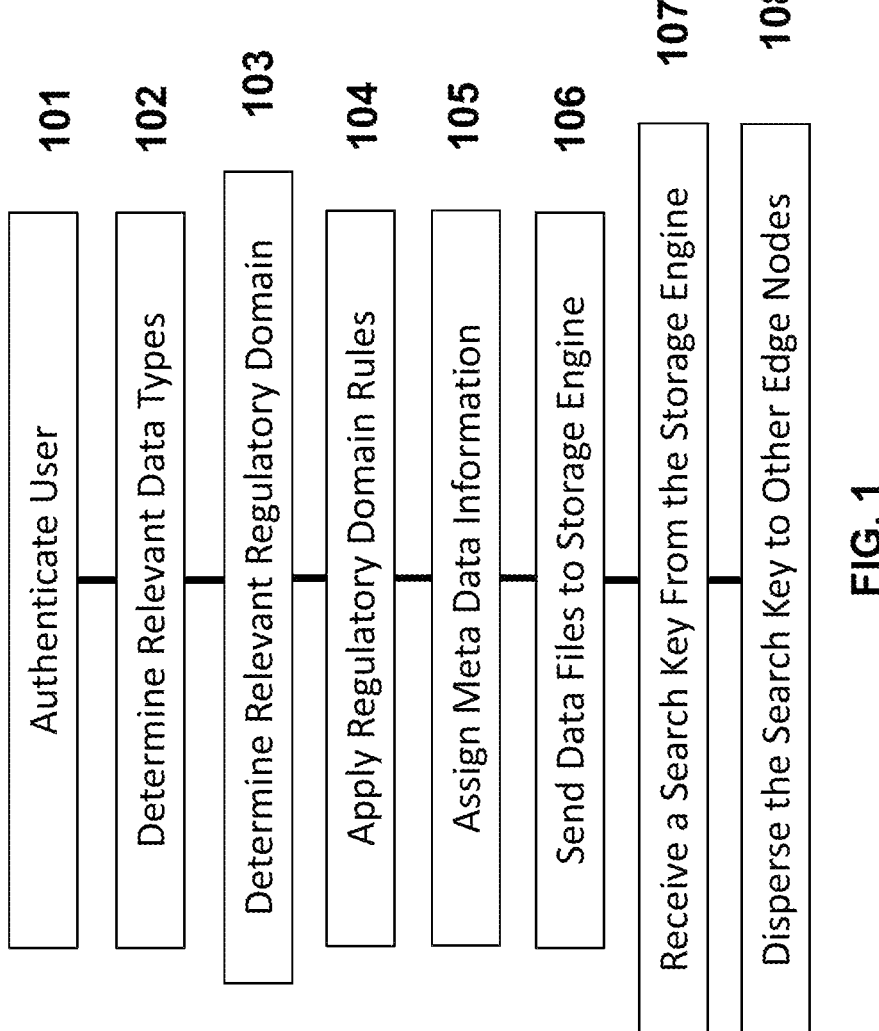
FIG. 1 shows a flow diagram showing the method steps of writing data to the global database system.

FIG. 1 illustrates the method steps of a write request 100 for storing sovereign data using the global database system as described throughout this document. Any data which is to be uploaded to the global database system is first authenticated before any of the other system processes take place, as shown in 101 of FIG. 1. In this embodiment the authentication is performed by a client identifier, wherein the client identifier authenticates a write request to upload one or more data files to the global database system. It will be realised that other common authentication type processes such as transaction identification number, visa grant number, relative identifier, can be used to verify the identity of a user and permit access to the uploading of data to the global database system.

Once a user or data has been authenticated and access has been granted, the system determines the relevant data types of the one or more data files at the edge node in which the user has gained access, as shown in 102 of FIG. 1. The relevant data type could be related to personal data, confidential data, financial data, intellectual property data or any other sensitive data that may need to be stored. Further, the edge node is part of a plurality of edge nodes forming a proxy layer, with each edge node in communication with the other plurality of edge nodes. As such, in this proxy layer system, or proxy cluster layer system, all the nodes know the configuration of all the other nodes.

In the next step 103, after determining the relevant data types of the one or more data files at the edge node, a relevant regulatory domain associated with the one or more data files is determined. The relevant regulatory domain is determined out of a plurality of regulatory domains, such as EU, US, China, India, UAE, Japan, etc. This is to find out what rules may be applied to the one or more data files in relation to how and where the one or more data files can be stored.

The regulatory domain rules associated with the determined relevant regulatory domain are then applied to the one or more data files, as in FIG. 1 step 104. Applying the regulatory domain rules is performed at the edge node in order to determine where to store the one or more data files, in particular to store the one or more data files on one or more storage devices associated with the one or more relevant regulatory domains.

Following the application of the regulatory domain rules of the one or more determined relevant regulatory domains, the next step 105 is to assign meta data information to each of the one or more data files, as shown in FIG. 1. The meta data information is based on the regulatory domain rules, which are associated with the one or more determined relevant regulatory domain. Again, the assignment of the meta data to the one or more data files is performed at the edge node of the proxy layer of the global database system. The meta data information may comprise different data fields such as in a data binary large object (BLOB) structure. The data fields may include information such as the region of the owner of the one or more data files; the allowed access regions; the expiry of the one or more data files based on the owner's region; the expiry of the one or more data files based on a non-owner's region; details of the encryption key; and other important information related to the storing (or stored) one or more data files. See Table 1 below for an example data blob structure.

TABLE 1

Data BLOB structure showing meta data
fields with example meta data
information, along with the optional
encryption key in the form of JSON
Web Encryption (JWE) format.
Data Blob Structure Meta Data fields
ownerRegion
allowedAccessRregions
ownerRegionExpiry
nonOwnerRegionExpiry
nonOwnerRegionCache
encryptionkey
JWE content/Data The next step 106 is to send the one or more data files from the edge node to a storage engine according to the regulatory domain rules, as determined by the system for the uploaded one or more data files. The storage engine is configured to store the one or more data files or process the one or more data files for storage. The storing of the data will be according to the domain rules, for example a particular data type can only be stored in a particular region or domain. The storage engine generates search keys associated with the local storage of the one or more data files. The search keys may comprise a reference to the region or area where the one or more data files are stored, for example IN for India, and/or may include a timestamp of the storing of the one or more data files, and/or if the data is replicated to other regions or areas. The type of search key may be chosen to reflect the information provided during the writing or uploading of data, or when requesting to access or read the stored data. The edge node receives the search keys associated with the storage of the one or more data files from the storage engine, as shown in 107 of FIG. 1. The search keys are then dispersed, as in step 108 of FIG. 1, from the edge node processing the storing of the data to the other edge nodes of the plurality of edge nodes forming the proxy layer of the global database system. As the search keys are dispersed across the proxy layer, locating the stored data from any accessible edge node is a quick and efficient process. If a search key directs the system to a particular local storage engine which is incorrect or the one or more data files have been deleted from that particular local storage, it will automatically redirect to the correct storage point, as each of the edge nodes are in communication with the plurality of edge nodes of the proxy layer.

Figure 2:
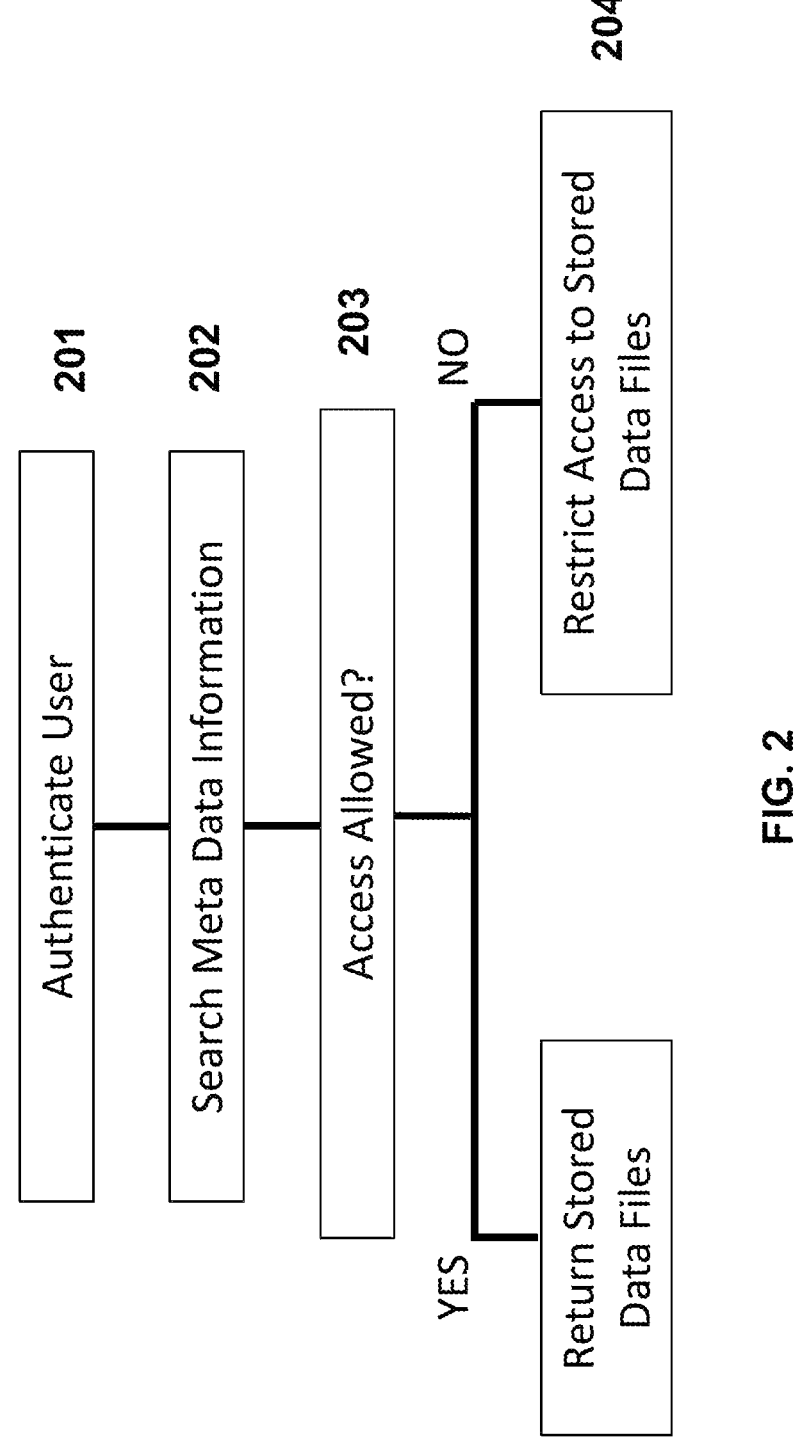
FIG. 2 shows a flow diagram showing the method steps of reading data from the global database system.

FIG. 2 illustrates the method steps of a read request 200 for reading sovereign data using the global database system as described throughout this document. Accessing the stored sovereign data, as described by the methods steps relating to FIG. 1 embodiment, requires authenticating the user to access the global database system. In a similar manner to the storing of the data, authentication of a read request to access one or more data files is performed by a client identifier as shown in step 201 of FIG. 2. Again, it will be realised that other common authentication type processes such as transaction identification number, visa grant number, relative identifier, can be used to verify the identity of a user and permit access to the reading of stored data in the global database system.

Next, at step 202, the system searches the meta data information on the proxy layer using the read request information. The system takes the request information as used in accessing one of the edge nodes and matches it with the search keys stored with the meta data on the plurality of edge nodes of the proxy layer. The global database system then, at step 203, returns the stored data files if rules of access based on the meta data information and the client identifier are satisfied, or restricts access to the stored data files if rules of access based on the meta data information and the client identifier are not satisfied.

In some embodiments there may be a step where the storage engine encrypts the one or more data files with encryption keys. For example, the encryption key may relate to one or more of the stored files and be in the form of JSON Web Encryption (JWE) format, such that it can be included into the meta data. Including it into the meta data information means the encryption key can also be searchable, if access has been allowed. Similarly in the read request the storage engine decrypts the key if the user has the relevant cryptographic key and permits access to the stored data.

In some embodiments, when accessing the one or more data files using the global database system, there may be a step wherein if access is restricted for particular stored data files the system redirects to another replicated version of the stored data files where access is allowed. For example, if there is a request at an edge node to read one or more data files stored at a particular location, say India, and access is not allowed in India or the files in India have expired, the system can redirect the read request to another edge node and/or storage engine where access is allowed.

Figure 3:
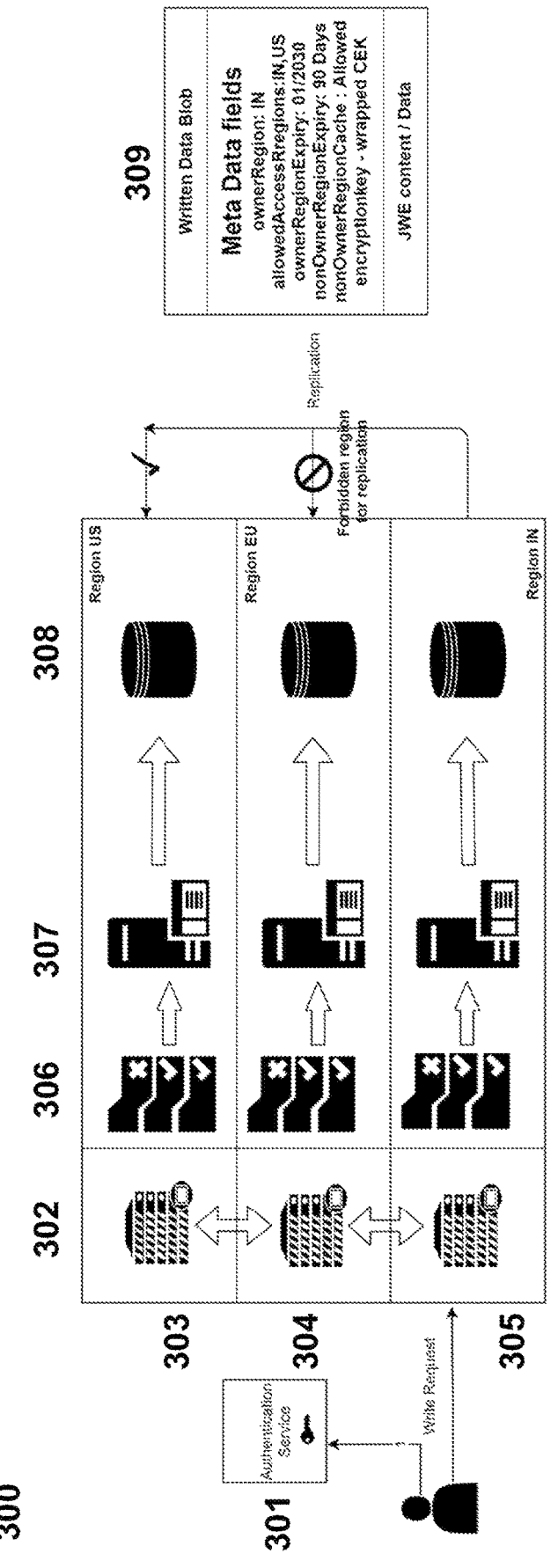
FIG. 3 shows an example diagram of data being stored for 3 regulatory domains (US, EU, India).

FIG. 3 is a diagram showing the process of storing data 300, in particular sovereign data, using the global database system according to certain regulatory domain rules. For this example the storing process is shown for 3 regulatory domains, namely, US, India and Europe. The different regulatory domains or regions are illustrated by the 3 levels in the diagram 300. Firstly, the user is authenticated using an authentication service 301 as shown in FIG. 3. The authentication service may be a client identifier or other authentication type process which will allow or restrict access to a user to the global database system. A write request is then submitted to the proxy layer 302 or proxy cluster layer 302, via an accessible edge node 303/304/305. In this case the write request is made to an edge node which corresponds to the Indian region as in this example the data to be stored is Indian Purchase Data. Other types of sovereign data may be used. The edge node is in communication with all other nodes of the proxy layer 302 as illustrated in FIG. 3. In the diagram 300 the US node 303 and the Indian node 305 are shown to be communicating with the European node 304 and as such the US node 303 and the Indian node 305 are also in communication with each other.

When the write request is submitted to the proxy layer 302 the proxy layer determines the relevant data type, for example purchase data. The proxy layer 302 then determines the relevant regulatory domain from information about the data, for example the BIN Issuer is in India or the Merchant is in India. The proxy layer 302 utilises a rules engine 306 to assign the relevant data type to the uploaded data, i.e. the one or more data files to be stored. The rules engine 306 also determines the regulatory domain that is relevant to the uploaded data, and applies any other data ownership rules that may be required. The proxy layer may also optionally perform extra processing 307 on the uploaded one or more data files such as creating search indices that are associated with the data, and/or encrypting the data using a form of cryptography to provide encryption keys which can be used in securely storing and accessing the uploaded data.

Then based on the regulatory domain rules the data is then sent from the proxy layer to the appropriate local storage engine 308, or directly to the appropriate local storage device or server 308. In FIG. 3 it is shown for the US, EU and India example that the data originating in India, i.e. Indian Purchase data, can be stored in the Indian region (Region IN), according to the data policies associated with the regulatory domain rules. Further, according to Indian data policies, the Indian Purchase Data can only be stored in Region IN but can also be accessed by clients/users associated with the US Region for a period of 90 days. The reason for the 90 days allowed access from the US is to facilitate queries or chargebacks that may arise from the purchase. This is illustrated in 308 of FIG. 3 where a copy or replica of the data is sent to Region US but Region EU is a forbidden replication region so does not receive a copy or replica of the data. The permitted access for the US for 90 days is stored in a data field of the meta data 309 associated with the stored Indian Purchase Data. Thus, after 90 days the system will delete the replica and restrict access to the Indian Purchase Data.

Other information about the Indian Purchase Data is stored in the meta data fields 309. For example, the owner region is stored as being India, with allowed access regions being India and the US. The meta data 309 also stores the owner region expiry and non-owner region expiry, as shown as 01/2030 and 90 days, respectively. Additional information such as non-owner region cache and encryption key type are also stored in the meta data file. In this case the non-owner region cache is allowed and the encryption key is a wrapped content encryption key (CEK).

Figure 4:
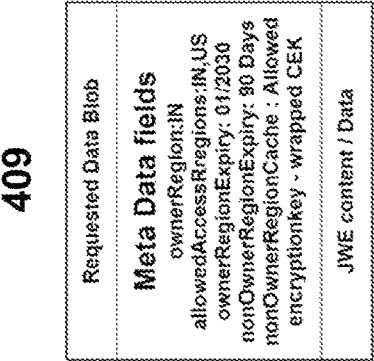
FIG. 4 shows an example diagram of data being read for 3 regulatory domains (US, EU, India).
Figure 4:
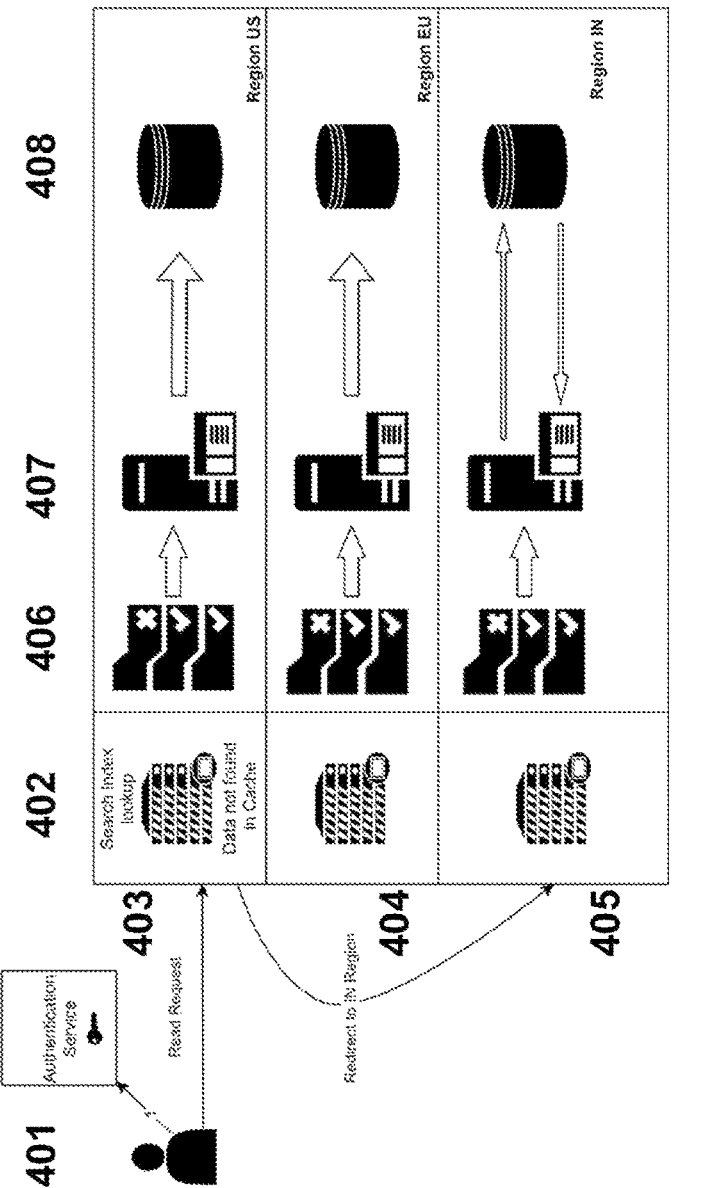

FIG. 4 is a diagram showing the process of reading data 300, in particular sovereign data, using the global database system according to certain regulatory domain rules. For this example the reading process is shown for 3 regulatory domains, namely, US, India and Europe, as was shown in FIG. 3 for storing data. Again, the different regulatory domains or regions are illustrated by the 3 levels in the diagram 400. Similarly to the storing of data, before being able to read or access the data, the client or user must be authenticated through an authentication service 401. Once authenticated, the read request along with the client's public encryption key are sent to the proxy layer 402 of the global database system.

When the read request is submitted to the proxy layer 402 the proxy layer performs a search of the meta data files stored on the global database system using the read request information. The read request information is matched up to the different data fields of the meta data files, as shown in 409 of FIG. 4, and the closest match is selected. In this example the client is accessing the proxy layer 402 from an edge node within the US region 403, therefore the search is initiated there. When the proxy layer does the initial search in that region and cannot locate the data in the Region US cache, the proxy layer redirects to Region IN 405 to find the data in the origin server. This process is based on the client information, read request information and the information stored in the meta data files 409. In this case, as access from the US is allowed in India according to the meta data field "allowedAccessRegions: IN, US" the system is able to redirect the search to Region IN.

Once the request is received in the Indian region the proxy layer performs the necessary processing 407 to retrieve the data, such as validating the data ownership and access, decrypting the encrypted data with the public key from the client, and any other processes required to access the data. As this is a read and not a write procedure the rules engine 406 is not required and is idle when not needed by the system. After performing all the necessary processes and access is allowed for the client or user, the system will retrieve the data from the stored region 408, in this case Region IN. The retrieval of the data from Region IN store 408 to the Indian region 405 of the proxy layer 402 is illustrated in FIG. 4 by the return arrow. The system then provides the data, as requested, at the edge node of the US Region 403.

If access at any point in the process is denied, whether at the authentication stage 401 or decryption stage 407 or through lack of allowed access regions, then the system will return an error to the client of user.

Figure 5:
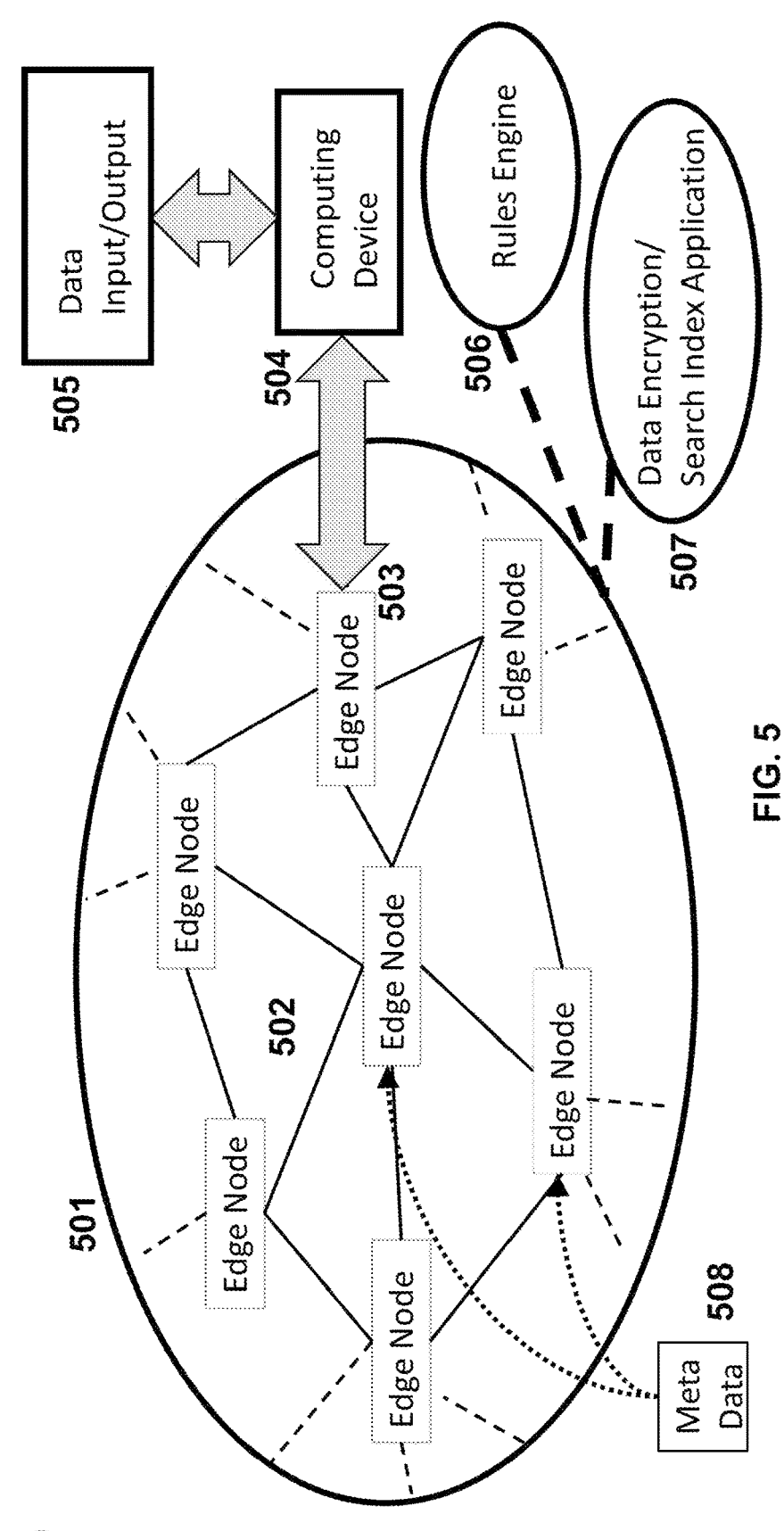
FIG. 5 shows the global database system with connected nodes and various countries.

FIG. 5 depicts the system structure 500 of the global database system 501. As FIG. 5 illustrates, the global database system is preferably a single stack system rather than copying the stacks to every region, i.e. is a generic program. Thus, the system is a worldwide accessible proxy layer or proxy cluster layer 502 system, with access to the system provided by a local edge nodes 503 of the proxy layer 502. The proxy layer 502 comprises a plurality of edge nodes 503 all interconnected such that each edge node 503 is in communication with each of the plurality of edge nodes 503.

In using the global databases system 501 to appropriately store data, the data 505 is input or uploaded to the system at a local edged node via a computing device 504, such as a PC, laptop, mobile device, financial terminal, or the like. The computing device 504 may have an authentication service or authenticating software to aid in secure client access to the global database system 501, or the authentication service may be a part of the global database system 501 itself.

When storing data using the global database system 501, the proxy layer may use a rules engine 506 to assign the regulatory domain rules to the uploaded data 505. The rules engine 506 comprises the means to provide up-to-date data policies governing all regulatory domains or regions. For example, a link to the relevant data policies or stored copies of the relevant data policies themselves in order to determine relevant set of rules that govern the handling of data. These set of rules are stored in the rules engine 506, for example the rule from the European Union (EU) General Data Protection Regulation (GDPR) policy, that European Purchase Data from an EU country cannot be stored outside the region would be stored in the rules engine 506.

As mentioned throughout the document, the global database system 501 may provide optional extra processing 507, such as data encryption and/or the creation of search indices, for increased security and ease of locating data, respectively. Again, the global database 501 system may use external applications to provide the extra processing 507 or it may be embedded within the system itself.

Once the system has performed all the necessary processes for storing data, as described elsewhere in this document, the data is stored in the relevant location and a meta data file 508 (or files) is created. The meta data file 508 contains information about the stored data, such as access permission, owner's region, expiration information, etc. (see Table 1), and is stored on the proxy layer 502. The proxy layer 502 then shares the meta data information 508 with all the plurality of edge nodes 503.

In the case where there is a read request and a client or user wishes to access the stored data, the global database system 501 authenticates the user similarly to the authentication for storing data, i.e. either at the computing device 504 using an authentication service such as a client identifier or as part of the system 501 itself. The global database system 501 performs the searching and decrypting processes on the proxy layer 502 as described elsewhere in this document, and if access is allowed the stored data is retrieved and data is output 505 to the client via the computing device 504. The data may be retrieved from either a local cache, a replica or the origin server if access is permitted. If access has been denied the system will generate an error message to be displayed at the computing device 504 rather than the data 505 output.

The global database system 501 can be configured to run batch updates and/or jobs, such as data replication or data expiration, at scheduled times over all stored data. These batch updates and/or jobs will be based on the updating of the appropriate data policies and relevant regulatory domain rules. For example, if a data policy changed such that the non-owner region expiration period changed from 90 to 120 days then this would be updated in the meta data files 508 for the appropriate stored data on the next scheduled batch update. If for example, the data policy changed such that data could no longer be stored outside a particular region, then a batch job would take place to delete all data stored outside that region at the next scheduled time. Being able to perform batch updates is another advantage of the global database system 501 installed as a generic program, as only a single batch update needs to occur each time and does not need to be performed across different versions of the program installed in different locations.

The invention claimed is:

1. A computer implemented method for sovereign data storage comprising:
   authenticating, via a client identifier, a write request to upload one or more data files to a global database system;
   determining, at an edge node of a plurality of edge nodes forming a proxy layer, relevant data types of the one or more data files;
   determining, at the edge node, a relevant regulatory domain associated with the one or more data files out of a plurality of regulatory domains;
   applying, at the edge node, regulatory domain rules associated with the one or more determined relevant regulatory domains to store the one or more data files on one or more storage devices associated with the one or more relevant regulatory domains;
   assigning, at the edge node, meta data information to the one or more data files, the meta data information being based on regulatory domain rules associated with the one or more determined relevant regulatory domain;
   sending, at the edge node, the one or more data files to a storage engine according to the regulatory domain rules for storage of the one or more data files;
   receiving, at the edge node from the storage engine, a search key associated with the stored one or more data files for local storage at the edge node; and dispersing, from the edge node to the other edge nodes of the plurality of edge nodes forming the proxy layer, the search keys.

2. The computer implemented method of claim 1, wherein the regulatory domain rules are associated with a particular region.

3. The computer implemented method of claim 2, wherein the regulatory domain rules represent a data policy of the associated particular region.

4. The computer implemented method of claim 1, wherein the regulatory domain rules comprise: access permission; replication instructions; expiration; or a combination thereof.

5. The computer implemented method of claim 1, wherein the method further comprises, on the storage engine, encrypting the one or more data files with encryption keys.

6. The computer implemented method of claim 1, wherein the global database system creates search indices according to the one or more data files and the assigned meta data.

7. The computer implemented method of claim 1, wherein the meta data files comprise a reference to the regulatory domain rules located outside the global database system.

8. The computer implemented method of claim 1, wherein the meta data files comprise the regulatory domain rules.

9. The computer implemented method of claim 1, wherein the one or more data files are automatically deleted after expiration of the data in accordance with the associated regulatory domain rules.

10. The computer implemented method of claim 1, wherein the meta data files are automatically updated when a change in the regulatory domain rules occurs.

11. The computer implemented method of claim 1, wherein the meta data files cannot be altered once stored.

12. The computer implemented method of claim 1, further comprising:
   authenticating, via a second client identifier, a read request to access one or more data files stored in the global database system;
   searching the meta data information on the proxy layer related to the read request of the one or more data files;
   returning the stored data files if rules of access based on the meta data information and the second client identifier are satisfied, or
   restricting access to the stored data files if rules of access based on the meta data information and the second client identifier are not satisfied.

13. A non-transitory storage medium, storing instructions that when executed by a processor, are configured to implement a data handling method comprising:
   authenticating, via a client identifier, a write request to upload one or more data files to a global database system;
   determining, at an edge node of a plurality of edge nodes forming a proxy layer, relevant data types of the one or more data files;
   determining, at the edge node, a relevant regulatory domain associated with the one or more data files out of a plurality of regulatory domains;
   applying, at the edge node, regulatory domain rules associated with the one or more determined relevant regulatory domains to store the one or more data files on one or more storage devices associated with the one or more relevant regulatory domains;
   assigning, at the edge node, meta data information to the one or more data files, the meta data information being based on regulatory domain rules associated with the one or more determined relevant regulatory domain;

sending, at the edge node, the one or more data files to a storage engine according to the regulatory domain rules for storage of the one or more data files;

receiving, at the edge node from the storage engine, a search key associated with the stored one or more data files for local storage at the edge node; and dispersing, from the edge node to the other edge nodes of the plurality of edge nodes forming the proxy layer, the search keys.

\* \* \* \* \*